United States Patent Office 3,510,283
Patented May 5, 1970

3,510,283
LOW DENSITY ABRASIVE CONTAINING AN EPOXY-NOVOLAK RESIN BOND
Jon P. McGurran, St. Paul, Minn., assignor to Minnesota Mining and Manufacturing Company, St. Paul, Minn., a corporation of Delaware
No Drawing. Filed Dec. 29, 1965, Ser. No. 517,475
Int. Cl. B24b 1/00; C08h 17/12
U.S. Cl. 51—295                                                      6 Claims

ABSTRACT OF THE DISCLOSURE

Abrasive structures in which abrasive grains are adhered to a support, especially low density fibrous abrasive wheels, have improved performance when made with an adhesive which is the hardened reaction product of substantially molar equivalent amounts of (1) polyphenolic polyglycidyl ether and (2) a novolak derived from phenols at least mono-ortho-substituted by an alkenyl group.

Hoover, Dupre, and Rankin U.S. Patent 2,958,593, the disclosure of which is incorporated herein by reference, describes and claims a low density abrasive article comprising a uniform lofty open non-woven web structure formed of many interlaced randomly extending flexible, durable, tough, resilient, organic fibers. The structure is unified by firmly bonding fibers together at points where they cross and contact one another to form a 3-dimensionally integrated structure throughout the web. Abrasive particles are distributed within the web and firmly bonded to web fibers by a binder adhesive, which may unify the structure by performing the dual function of bonding web fibers together and bonding abrasive grains thereto.

Where the binder adhesive in a low density abrasive product is hard and rigid, web fibers sometimes tear when the product is snagged on a burr or other projection. Plasticizing a rigid binder such as a phenolic resin improves tear resistance, but it is extremely difficult to obtain optimum plasticization without sacrificing abrading effectiveness. Epoxy resins impart good tear resistance but the normal curing agents either are excessively toxic, do not provide adequate heat resistance, or result in short pot life.

Low density abrasive web may also be wound convolutely to form a roll, adhesive being used to hold subsequent layers of web together and unify the resultant structure. The roll is then sliced or cut to form wheels having the desired width, mounted on a shaft, and forced against workpieces to remove scale, dirt, or scratches, the circumferential portion of the wheel yielding to conform to surface irregularities.

Heretofore most commercial low density abrasive wheels employed phenol-formaldehyde resin to bond web fibers together and to bond abrasive grains thereto, and polyurethane foam to unite successive layers. Although such wheels are effective in most operations, continued running under high pressures results in flexing and appears to cause a buildup of heat, often leading to the wheel's exploding long before its useful potential has been realized. Many unsuccessful attempts have been made to solve this problem, including the use of a wide variety of unifying resins to replace either the phenol-formaldehyde, the polyurethane, or both. Prior to the present invention, however, all such modifications resulted in products which, although useful in specific operations, could not be employed in the wide variety of operations normally encountered in industry without proving inadequate in heat resistance, tear strength, or abrading ability.

Products made in accordance with this invention are structurally similar to those described in the Hoover et al. patent, but employ an epoxy-novolak adhesive which is the hardened reaction product of (1) a polymer having a plurality of oxirane rings of the type reactive with phenolic OH groups and (2) a novolak resin. The co-reactants are low in toxicity and cure slowly at room temperature but rapidly at an elevated temperature. Low density abrasive webs in which the fibers are bonded to each other and the abrasive granules are bonded to the structure by adhesives of this type are characterized by the same excellent conformability and abrading characteristics as the conventional products but possess significantly greater toughness, tensile strength, and tear-resistance. Convolutely wound wheels in which the epoxy-novolak adhesive unites successive layers, are characterized by improved heat-resistance, rate of cut, and durability. Wheels of this type may be made with the epoxy-novolak resin as both adhesives.

Novolak resins, which are the acid-catalyzed thermoplastic reaction products of a phenol and a stoichiometric insufficiency of an aldehyde, are well known in the art. Preparation of 3,3' diallyl Bisphenol A novolak, a particularly effective product which was originally prepared by my co-worker Carl M. Smith, will now be described:

A mixture of 2000 parts by weight (12.0 equivalents) of 3,3'-diallyl Bisphenol A, 130 parts by weight (4.34 moles) of paraformaldehyde, 62.7 parts by weight of anhydrous oxalic acid and 627 parts by volume of toluene is stirred for 20 minutes while gradually heating to 70° C., at which temperature an exothermic reaction commences. Heating is discontinued and in an additional 20 minutes the temperature rises to 93° C. and then commences to drop. Heating is resumed and the mixture is refluxed at about 98°–99° C. for 5 hours and then allowed to cool to 80° C. The oxalic acid is neutralized by adding 800 parts by volume of water and 130 parts by weight of sodium bicarbonate while stirring the mixture vigorously. Water and toluene are then removed by distillation to 120° C. at 5 mm. Hg pressure. After cooling, the crude novolak resin is taken up in acetone, filtered to remove salts and brought to a reside of brown viscous novolak resin at 120° C. and 1 mm. Hg pressure. This C-allyl-substituted novolak resin has a hydroxyl equivalent by acetylation of 165, an average molecular weight (in acetone) of 691, and a functionally of 4.2.

The 3,3' diallyl Bisphenol A novolak just described is blended with curable oxirane group-containing compounds and polymers in proportion such that there is substantial molar equivalence between the phenolic OH groups and the oxirane rings, in the presence of catalysts such as tris (N,N dimethylaminomethylphenol) ("DMP–30"). The type and amount of catalyst needed to effect the desired rate of cure govern the exact ratio chosen.

Presently preferred novolaks are derived from mono-ortho-alkenyl phenols and di-ortho-alkenyl (ortho to the HO group) bisphenols. Presently preferred oxerane polymers are polyphenolic polyglycidyl ethers such as the polydiglycidyl ethers of Bisphenol A, e.g., "Epon 828," available from Shell Chemical Company, or "ERL 2774," available from Bakelite Company.

The invention will now be further described with the aid of illustrative examples, which were made substantially according to the method described in detail in the aforementioned Hoover et al. patent. All parts are by weight unless otherwise noted. In each of these examples a "Rando-Webber" machine is used to form a lofty nonwoven mat approximately ¾ inch thick from 1½ inch crimpset Type 6 nylon fibers. In examples 1–4, the mat is pre-bonded by passing it between a pair of vertically aligned squeeze rolls, the lower roll dipping in a pan containing a liquid resin composition. One surface of the pre-bonded web is then sprayed with a slurry comprising abrasive granules and curable resin, the resin globules penetrating at least about halfway through the web, after which the resin is partially cured. The other surface of the web is then similarly sprayed with a slurry of resin and abrasive granules, and all resin systems further cured, the final product having thickness of about ⅜ inch (15 denier fibers) to ½ inch (50 denier fibers) and a void volume of about 95%.

The low density abrasive web product is then wound snugly upon itself about a tubular cardboard core, bonded with a resin composition and the resin cured at an appropriate temperature. The bonded roll is then slit into 2-inch widths to form wheels which are tested as follows: Each wheel is mounted on a horizontal shaft and driven at 1140 r.p.m. while a ½ inch diameter x 6 inch long cold rolled steel rod is positioned parallel to the axis of the wheel and urged against the periphery under a total force of 25 lbs. The rod is weighed at 3-minute intervals, the duration of the test being ten such intervals unless failure occurs sooner. Wheel diameter is measured at the beginning and end of the test. This test is closely related to certain commercial operations where low density abrasive wheels are used to clean, polish, or impart a finish to the outer periphery of tubes and pipes.

EXAMPLE 1

A low density nonwoven web, weighing 45 grains per 24 square inches, was formed from 50-denier crimpset nylon fibers and pre-bonded with 30 dry grains per 24 square inches of an ethylene glycol monoethyl ether solution of 70 parts of base-catalyzed phenol-formaldehyde resin and 30 parts "Epicure 852" (an amine-terminated long chain fatty acid plasticizer containing some amide groups). The web was then sprayed on one side with a slurry made up of 988 parts Grade 100–150 silicon carbide granules, 1000 parts base-catalyzed phenol-formaldehyde resin (solids basis), employing water and ethylene glycol monoethyl ether as solvents, a total dry weight of 75 grains per 24 square inches being applied. The resin was precured to a tackfree condition and the web then inverted and sprayed with the same slurry on the opposite side, applying 90 grains of solids per 24 square inches. The resins were then cured, to form a unified low density abrasive web product.

The low density abrasive web was wound convolutely about an adhesive-coated 3-inch cardboard core to form an 8-inch diameter roll having a density of 6 layers per radial inch, weighed, banded with filament tape and immersed in a vat of 50% solids xylene solution containing 53 parts "Epon 828," 47 parts 3,3′ diallyl Bisphenol A novolak, and 0.5 part "DMP–30." The thus-saturated roll was then removed, spun to remove the excess resin, and again weighed, the amount of resin solution retained constituting about ¼ the weight of the roll before saturation. The roll was then placed in an oven and air at 250–300° F. drawn axially through the web for 1–2 hours to cure the epoxy-novolak resin. The roll was then slit to form 2-inch wide wheels.

When subjected to the abrading test previously described, wheels made in accordance with this example removed 73 grams of steel in 30 minutes while decreasing 1.9 inches in diameter. This performance is considered excellent.

EXAMPLE 2

A low density abrasive web was formed from 50-denier nylon in the same manner as in Example 1 except that the epoxy novolak resin described in Example 1 was employed as both the pre-bonding and slurry adhesive, the viscosity being adjusted to 140–180 and 210–240 cps. respectively. Machine and cross direction tensile strengths were respectively 17.2 and 17 lbs. per inch of width, compared to 8.5 and 12.5 lbs. per inch for a control web made with phenol-formaldehyde resin. Shear strength, as measured by a modified Elmendorf shear test, was 2900 for the experimental product and 1350 for the control. The experimental product was found to be appreciably more tear-resistant when used in operations where snagging represented a major problem.

The low density abrasive web of this Example 2 was then formed into 2″ x 8″ convolutely wound wheels in the manner described hereinabove and unified with the novolak-epoxy resin system. When subjected to the abrasion test previously described, the wheel removed 78 grams of steel in 30 minutes while losing 0.3 inch diameter. This performance is considered outstanding.

EXAMPLE 3

A low density nonwoven web, weighing 25 grains per 24 square inches, was formed from 15-denier nylon fibers and pre-bonded with 10 dry grains per 24 square inches of an ethylene glycol monoethyl ether solution of 75 parts base-catalyzed phenol-formaldehyde resin and 25 parts "Epicure 852." The web was then sprayed on one side with a slurry made up of 2 parts Grade 500 and finer silicon carbide, 1 part base-catalyzed phenol-formaldehyde resin (solids basis), and ethylene glycol monoethyl ether solvent, a total dry weight of 45 grains per 24 square inch being applied. The resin was then heated to a tackfree condition, after which the web was inverted and sprayed with 50 grains of the same silicon carbide-resin slurry. The resins were then cured to form a unified low density abrasive web product.

The low density abrasive web was wound convolutely about an adhesive-coated 8-inch cardboard core to form a 14-inch diameter roll having a density of 8 layers per radial inch, unified with the epoxy-novolak resin, and slit to 2-inch width, as in Example 1. When subjected to the abrading test previously described, the wheel removed 4.3 grams of steel in 30 minutes while losing ½ inch of diameter. Considering the finess of the abrasive granules, this performance is considered good.

EXAMPLE 4

A low density abrasive web was formed from 15-denier nylon in the same manner as in Example 3 except that the epoxy-novolak resin was employed as both the pre-bonding and slurry adhesive. When compared to a control resin (plasticized phenolic pre-bonding adhesive and phenolic resin slurry adhesive), the low density abrasive web of this example showed superior tensile strength and tear resistance and performed appreciably better in operations where the workpiece showed a tendency to snag the low density.

The low density abrasive web of this example was then formed in 2″ x 14″ convolutely wound wheels as described in Example 3. When subjected to the abrasion test previously described, the wheel unified with the epoxy-novolak removed 11.8 grams of steel in 30 minutes while losing ½ inch in diameter.

EXAMPLE 5

A lofty nonowoven web was formed from 15-denier crimped nylon fibers as in the preceding examples but was not pre-bonded. The web was then passed between a pair of vertically stacked squeeze rolls, the lower of which turned in a pan of slurry containing 1 part epoxy-novolak resin (solids basis), 2 parts Grade 500 and finer silicon carbide, and sufficient ethylene glycol monoethyl ether to reduce the viscosity to 1000 cps., a total of 95 dry grain being applied. The epoxy-novolak was then partially cured at 300°–350° F., after which the web was formed into a 2″ x 14″ wheel, succcessive convolutions of which were unified with epoxy-novolak resin, as in Example 4. When subjected to the abrading test previously described, the wheel of this example removed 7.5 grams of steel in 30 minutes, while losing only ⅛ inch in diameter.

From the foregoing examples it is clear that the use of the epoxy-novolak resin formulation as a unifying resin anywhere in a low density abrasive structure results in a product superior to the best previously available products. Where the desired product is a convolutely wound wheel, the ratio of cut wheel to diameter loss is a maximum when epoxy-novolak is employed for both the slurry adhesive and the lap-bonding adhesive.

Although this invention has been described with reference to low density abrasive structures, coated abrasive products may also be made with epoxy-novolak resin as the make and/or sandsize adhesive, bonding abrasive grains to a conventional sheet support member.

What I claim is:

1. An improved low-density abrasive product wherein abrasive granules are bonded throughout a lofty porous compressible nonwoven fibrous mat having interconnected 3-dimensionally extending voids which constitute the majority of the volume thereof, the fibers of said article being bonded to each other and the abrasive granules bonded to said fibers by the hardened epoxy-novolak reaction product of substantially molar equivalent amounts of (1) polyphenolic polyglycidyl ether of the type reactive with phenolic OH groups and (2) a novolak derived from phenols at least mono-ortho-substituted by an alkenyl group.

2. The product of claim 1 wherein the novolak is 3,3′diallyl Bisphenol A novolak.

3. A durable heat-resistant, rapid-cutting low density fibrous abrasive wheel formed from a convolutely wound web of low density fibrous abrasive wherein a first adhesive bonds abrasive granules at spaced points throughout a lofty porous compressible mat having interconnected 3-dimensionally extending voids which constitute the major portion of the volume of said mat, said mat being formed from strong, tough, intertwined fibrous members, said mat being wound convolutely upon itself in roll form, and a second adhesive bonds adjacent convolutions of said web together, at least the second one of said adhesives being an epoxy-novolak resin which is the cured reaction product of substantially molar equivalent amounts of a polyphenolic polyglycidyl ether and 3,3′ diallyl Bisphenol A novolak.

4. The wheel of claim 3 wherein both said first adhesive and said second adhesive consist essentially of an epoxy-novolak resin which is the cured reaction product of substantially molar equivalent amounts of a polyphenolic polyglycidyl ether and 3,3′ diallyl Bisphenol A novolak.

5. An abrasive structure wherein abrasive grains are bonded to a support member by an epoxy-novolak resin which is the hardened reaction product of substantially molar equivalent amounts of (1) a polyphenolic polyglycidyl ether and (2) a novolak derived from phenols at least mono-ortho-substituted by an alkenyl group.

6. The fibrous mat of claim 1 wound convolutely upon itself in roll form, adjacent convolutions being adhesively bonded together.

References Cited

UNITED STATES PATENTS

| | | | |
|---|---|---|---|
| 2,779,668 | 1/1957 | Daniels et al. | 51—298 |
| 2,880,080 | 3/1959 | Rankin et al. | 51—298 |
| 2,958,593 | 11/1960 | Hoover et al. | 51—295 |
| 3,052,650 | 9/1962 | Wear et al. | 1—298 |
| 3,205,054 | 9/1965 | Tucker | 51—298 |
| 3,226,214 | 12/1965 | Daniels et al. | 51—298 |
| 2,521,911 | 9/1950 | Greenlee | 51—298 |
| 3,020,139 | 2/1962 | Camp et al. | 51—298.1 |
| 3,273,984 | 9/1966 | Nelson | 51—299 |

DONALD J. ARNOLD, Primary Examiner

U.S. Cl. X.R.

51—296, 297, 298